United States Patent
Ali et al.

(10) Patent No.: US 11,128,023 B2
(45) Date of Patent: Sep. 21, 2021

(54) SUBSTRATE DESIGN FOR EFFICIENT COUPLING BETWEEN A PACKAGE AND A DIELECTRIC WAVEGUIDE

(71) Applicant: Texas Instruments Incorporated, Dallas, TX (US)

(72) Inventors: Hassan Omar Ali, Murphy, TX (US); Juan Alejandro Herbsommer, Allen, TX (US); Benjamin Stassen Cook, Los Gatos, CA (US); Vikas Gupta, Dallas, TX (US); Athena Lin, West Lafayette, IN (US); Swaminathan Sankaran, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/716,642

(22) Filed: Dec. 17, 2019

(65) Prior Publication Data
US 2020/0321677 A1    Oct. 8, 2020

Related U.S. Application Data

(60) Provisional application No. 62/809,051, filed on Feb. 22, 2019.

(51) Int. Cl.
| | |
|---|---|
| *H01P 3/16* | (2006.01) |
| *H01Q 1/22* | (2006.01) |
| *H04B 1/40* | (2015.01) |
| *H01P 3/12* | (2006.01) |

(52) U.S. Cl.
CPC ............... *H01P 3/16* (2013.01); *H01P 3/121* (2013.01); *H01Q 1/2283* (2013.01); *H04B 1/40* (2013.01)

(58) Field of Classification Search
CPC ......... H01P 3/16; H01P 3/121; H01Q 1/2283; H04B 1/40
See application file for complete search history.

(56) References Cited

U.S. PATENT DOCUMENTS

| | | |
|---|---|---|
| 9,300,025 B2 | 3/2016 | Herbsommer et al. |
| 9,306,259 B2 | 4/2016 | Herbsommer |
| 9,520,635 B2 * | 12/2016 | Fakharzadeh ........... H01P 11/00 |

(Continued)

OTHER PUBLICATIONS

"Circular Waveguide Sizes Table", Qualwave, available at http://www.qualwave.com/resources/circular-waveguide-sizes.htp on Oct. 15, 2019, pp. 1-2.

(Continued)

*Primary Examiner* — Dinh T Le
(74) *Attorney, Agent, or Firm* — Ray A. King; Charles A. Brill; Frank D. Cimino

(57) ABSTRACT

A device includes a multilayer substrate having a first surface and a second surface opposite the first surface. An integrated circuit is mounted on the second surface of the multilayer substrate, the integrated circuit having transmission circuitry configured to process millimeter wave signals. A substrate waveguide having a substantially solid wall is formed within a portion of the multilayer substrate perpendicular to the first surface. The substrate waveguide has a first end with the wall having an edge exposed on the first surface of the multilayer substrate. A reflector is located in one of the layers of the substrate and is coupled to an edge of the wall on an opposite end of the substrate waveguide.

29 Claims, 9 Drawing Sheets

(56) References Cited

U.S. PATENT DOCUMENTS

| | | | |
|---|---|---|---|
| 9,577,340 B2* | 2/2017 | Fakharzadeh | H01Q 13/02 |
| 9,614,584 B2* | 4/2017 | Herbsommer | H01P 3/16 |
| 10,371,891 B2 | 8/2019 | Cook | |
| 2009/0079648 A1* | 3/2009 | Matsuo | H01Q 21/0087 |
| | | | 343/771 |
| 2015/0257254 A1* | 9/2015 | Suzuki | H05K 1/0243 |
| | | | 343/700 MS |
| 2019/0109362 A1 | 4/2019 | Haroun et al. | |

OTHER PUBLICATIONS

TI-79592, "Circularly-Polarized Dielectric Waveguide Launch for Milimmeter-Wave Data Communication", U.S. Appl. No. 16/393,809, filed Apr. 24, 2019, pp. 1-24.

\* cited by examiner ical waves. In this way they lose their power proportionally to the square of the distance; that is, at a distance R from the source, the power is the source power divided by $R^2$. A dielectric waveguide (DWG) may be used to transport high frequency signals over relatively long distances. The waveguide confines the wave to propagation in one dimension so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. A common type of waveguide is one that has a rectangular cross-section, one that is usually not square. It is common for the long side of this cross-section to be twice as long as its short side. These are useful for carrying electromagnetic waves that are horizontally or vertically polarized. Another common type of waveguide is circular. Circular waveguides are useful for carrying electromagnetic waves that are circularly polarized. Circular dielectric waveguides are easy to manufacture using known or later developed techniques.
SUBSTRATE DESIGN FOR EFFICIENT COUPLING BETWEEN A PACKAGE AND A DIELECTRIC WAVEGUIDE

CROSS-REFERENCE TO RELATED APPLICATION

This application claims priority to U.S. Provisional Application No. 62/809,051, filed Feb. 22, 2019, entitled "Substrate Design to Enable Efficient Coupling Between Package and Dielectric Waveguide," which is incorporated by reference herein.

TECHNICAL FIELD

This relates to a substrate design to enable coupling between a package and a dielectric waveguide for mm-wave applications.

BACKGROUND

In electromagnetic and communications engineering, the term waveguide may refer to any linear structure that conveys electromagnetic waves between its endpoints. The original and most common meaning is a hollow metal pipe used to carry radio waves. This type of waveguide is used as a transmission line for such purposes as connecting microwave transmitters and receivers to their antennas, in equipment such as microwave ovens, radar sets, satellite communications, and microwave radio links.

A dielectric waveguide (DWG) is a high frequency alternative to copper wires and optical cables. A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the dielectric constant (εk). The term insulator is generally used to indicate electrical obstruction while the term dielectric is used to indicate the energy storing capacity of the material by means of polarization.

SUMMARY

In described examples, a device includes a multilayer substrate having a first surface and a second surface opposite the first surface. An integrated circuit is mounted on the second surface of the multilayer substrate, the integrated circuit having transmission circuitry configured to process a millimeter wave signal. A substrate waveguide having a substantially solid wall is formed within a portion of the multilayer substrate perpendicular to the first surface of the substrate. The substrate waveguide has a first end with the wall having an edge exposed on the first surface of the multilayer substrate. A reflector is located in one of the layers of the substrate and is coupled to an edge of the wall on an opposite end of the substrate waveguide.

DETAILED DESCRIPTION

Figure 1:
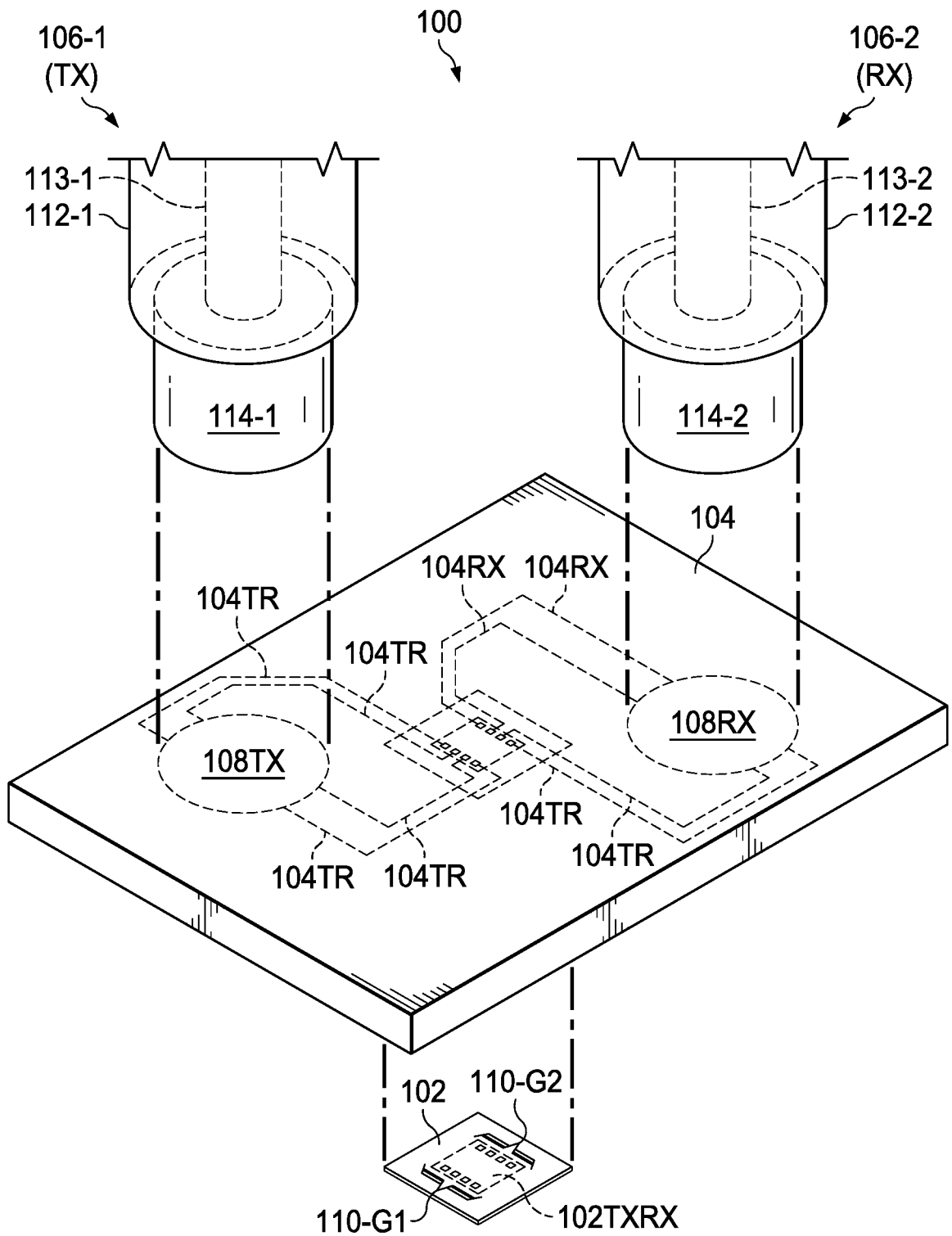
FIG. 1 is an exploded partial view of a dielectric waveguide (DWG) communication system.

In the drawings, like elements are denoted by like reference numerals for consistency.

Waves in open space propagate in all directions as spherical waves. In this way they lose their power proportionally to the square of the distance; that is, at a distance R from the source, the power is the source power divided by $R^2$. A dielectric waveguide (DWG) may be used to transport high frequency signals over relatively long distances. The waveguide confines the wave to propagation in one dimension so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. A common type of waveguide is one that has a rectangular cross-section, one that is usually not square. It is common for the long side of this cross-section to be twice as long as its short side. These are useful for carrying electromagnetic waves that are horizontally or vertically polarized. Another common type of waveguide is circular. Circular waveguides are useful for carrying electromagnetic waves that are circularly polarized. Circular dielectric waveguides are easy to manufacture using known or later developed techniques.

Common problems that may occur when coupling a DWG to a radiating element include: poor isolation between a transmitter antenna and a receiver antenna located in the same microelectronic device; poor alignment between the radiating elements and the interconnect; and sub-optimal impedance matching between the antennas and the dielectric waveguide(s). A root cause is the lack of a well-defined electrical and mechanical interface between the radiating elements on a microelectronic device and the DWG interconnect.

Examples described hereinbelow improve the interface between electromagnetic radiation elements on a microelectronic device and a DWG interconnect. An interposer that acts a buffer zone may be used to establish two well defined reference planes that can be optimized independently. A first plane is located between the radiating elements and the interposer and a second plane is a surface between the interposer and the DWG interconnect. The interposer allows for the introduction of features that improve the isolation between transmitter and receiver antennas in the device, relax the alignment tolerances, and enhance the impedance matching between the antennas and the dielectric waveguide. The interposer is a block of material that interfaces the antennas in a substrate with a DWG connector. The interposer has defined regions that align with the antennas and act as waveguides to conduct a signal from a radiating element on a microelectronic device substrate to a DWG connector. Several example interposers are described in more detail in U.S. Patent Publication 2019-0109362, entitled "Interposer Between Microelectronic Package Substrate and Dielectric Waveguide Connector for mm-Wave Application" which is incorporated by reference herein. As will be described in more detail hereinbelow, a waveguide that is integrated within a substrate of the microelectronic device guides back-scattered radiation from the radiation elements towards an interposer that is mounted on the substrate.

In this manner, a structure is formed in a substrate on which an mm-wave transceiver mounted that functions as a substrate integrated waveguide, as an interface to a waveguide-based transmission medium, as a placement guide for such transmission medium, and as a means to improve channel-to-channel isolation.

FIG. 1 is an exploded partial view of a dielectric waveguide (DWG) communication system 100. System 100 includes an integrated circuit (IC) die 102, a multilayered substrate 104, and a transmit (TX) and receive (RX) DWG cable assembly 106-1 and 106-2, respectively, with physical attachment and electrical couplings between these devices. IC die 102 is physically attached to a first side (e.g., bottom) of multilayered substrate 104, such as by die mount techniques. Both of TX and RX cable assemblies 106-1 and 106-2 physically attach to a side (e.g., top) of multilayered substrate 104 opposite IC die 102, by a mechanism, such as screws, clips, mounts, or the like. TX cable assembly 106-1 is axially aligned relative to a transmit region 108TX on substrate 104, and RX cable assembly 106-2 is axially aligned relative to a receive region 108RX on substrate 104. With such alignment and the further attachment of substrate 104 to IC die 102, millimeter electromagnetic waves may communicate between cable assemblies 106-1 and 106-2, from and to IC die 102, with such waves communicated by both antennas (and respective feed structures), and waveguides, constructed in multilayered substrate 104.

IC die 102 has attributes and sizing of integrated circuit technology. In this example, IC die 102 is a 3 mm×3 mm square, while substrate 104 is approximately 6 mm×8 mm. IC die 102 includes a transceiver shown generally as transceiver 102TXRX (connections not separately shown) configured to transmit and receive signals. The operating frequencies and bandwidth of the transceiver signals may be selected according to application, such as for communicating along DWG media in the millimeter wave range (e.g., 110 to 140 GHz). While not separately shown, transceiver 102TXRX may include one or more processors (e.g., digital signal processor) and support multiple transmit and receive channels, radio configuration, control, calibration, and programming of model changes for enabling a wide variety of implementations. IC die 102 includes a number of conductive members, such as die pads, shown generally in groups 110-G1 and 110-G2. Conductive areas 110-G1 and 110-G2 (e.g., die pads) are physically positioned to align with conductive areas (e.g., pads below) substrate transmit and receive regions 108TX and 108RX, respectively, so conductors (e.g., copper pillars or other bump structures) may be electrically coupled between opposing ones of such areas. Accordingly, when IC die 102 is affixed physically relative to multilayer substrate 104, it likewise is electrically coupled to electrical paths of substrate 104, including traces 104TR, for electric connection between IC die 102 and regions 108TX and 108RX. Through this electrical coupling, millimeter wave signals may be communicated between IC die 102 and antennas constructed within multilayer substrate 104, as described below.

Dielectric waveguide cable assemblies 106-1 and 106-2 each include a respective dielectric cable 112-1 and 112-2, such as a cylindrical outer cladding concentrically surrounding a respective cylindrical inner core 113-1 and 113-2, but other cable configurations including a dielectric are also possible. The outer cladding has a dielectric constant $\varepsilon(OC)$, and the inner core has a dielectric constant $\varepsilon(IC)$. In this example, the diameter of the outer cladding may be in the range of 3 to 6 mm, and the diameter of the inner core may be in the range of 1.5 to 2 mm. Preferably, the inner core dielectric constant $\varepsilon(IC)$ is sufficiently greater than the outer cladding constant $\varepsilon(OC)$, so that a millimeter wave may be coupled to the cable, and its energy will be concentrated in the inner core. In this manner, even though the cable material is dielectric in nature, which is often insulating in nature, the dielectric will allow energy to travel along it, whereas an insulator will not pass charge. Accordingly, example embodiments permit use of relatively inexpensive dielectric materials for the cable core, such as polyethylene, and in connection with system 100 may efficiently communicate millimeter wave signals from transceiver 102TXRX to cable 112-1, and thereby to a device (not shown) at the distal end of the cable.

Each of cable assemblies 106-1 and 106-2 can be mated to a respective interposer 114-1 and 114-2. In an example embodiment, each interposer waveguide 114-$x$ has a cylindrical shape, having a height such as 1.5 mm and a center axis that aligns with the center axis of the core 113-$x$, with both axes to align with a respective one of regions 108TX and 108RX. In this example, each interposer waveguide 114-1, 114-2 has a metallic outer wall. The interior of each interposer waveguide 114-1, 114-2 is a hollow and therefore usually filled with air, however some examples may be filled with a solid dielectric material. The outer diameter of a cable 113-$x$ may vary and may exceed the outer diameter of a corresponding interposer 114-$x$ as shown in the illustrated example, while the outer diameter of a core 113-$x$ is less than the inner diameter of a corresponding interposer 114-$x$. With such dimensions and axial alignments, the circular inner diameter of each interposer 114-$x$ physically aligns with a respective transmit or receive region 108TX and 108RX, and the cylindrical shape provides a circular cross-section for both physically and wave coupling to transmit and receive regions 108TX and 108RX. Also, in example embodiments, wave communication in system 100 is by circular polarization, so the circular cross-section of each interposer 114-$x$ assists to guide the circularly polarized wave between the dielectric cable inner core 113-$x$ and multilayered substrate 104.

Figure 2:
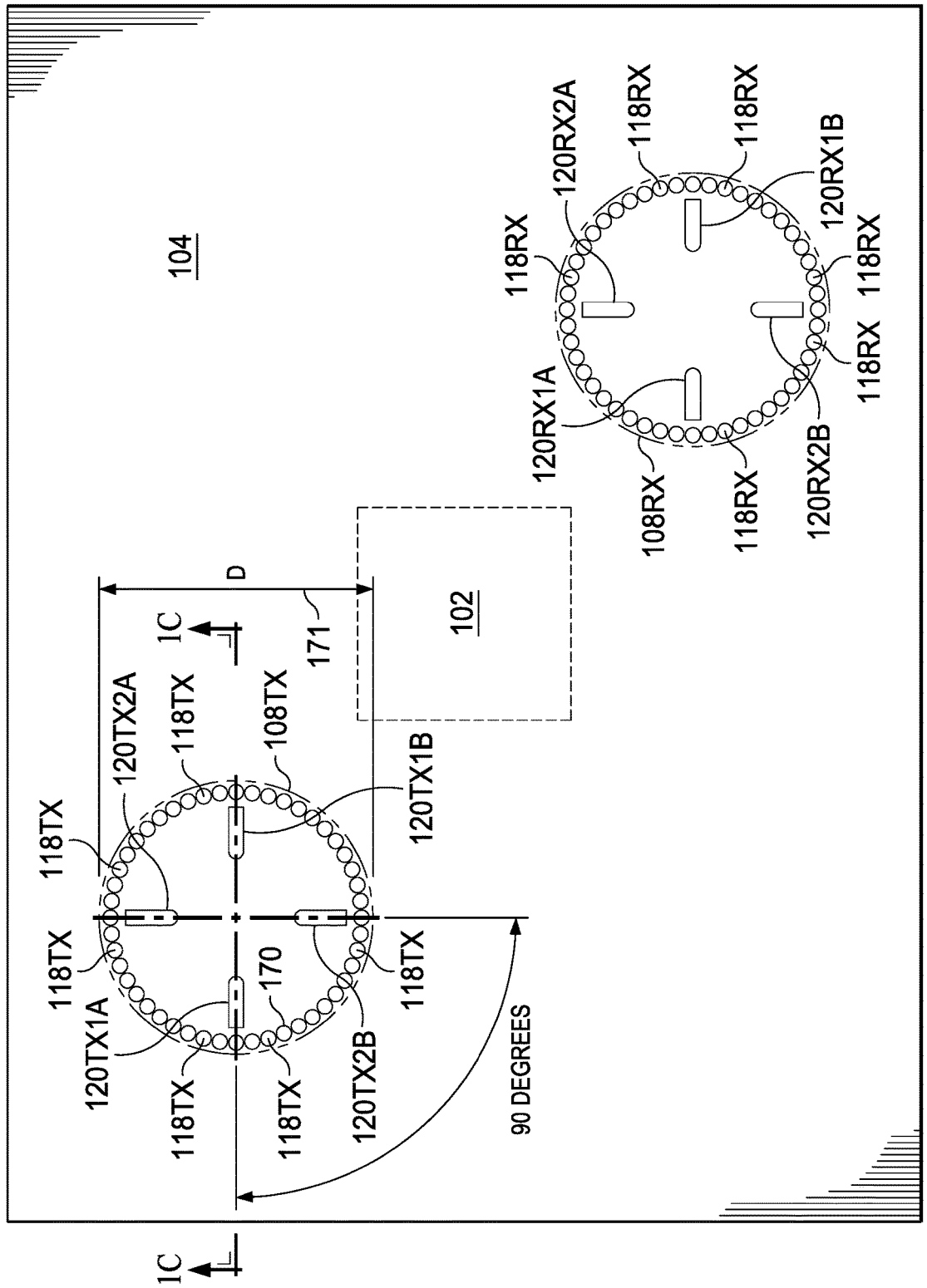
FIG. 2 is a plan view of a multilayered substrate used in the system of FIG. 1.

FIG. 2 is a plan view of multilayered substrate 104, with IC die 102 shown by a dashed rectangle, being positioned beneath substrate 104 in the view. In the plan view, each of transmit region 108TX and receive region 108RX of substrate 104 is further illustrated, and example features in the top metal layer of substrate 104 are shown. For example, in transmit region 108TX, just inside the perimeter of region 108TX, a number of via waveguide tops 118TX are located. Similarly, in receive region 108RX, just inside the diameter of region 108RX, a number of via waveguide tops 118RX are located.

Each via waveguide top 118 is a metal pad, of a same shape (e.g., circular), in the top metal layer of substrate 104. Further, via waveguide tops 118 are equally and circumferentially spaced, where the number of tops 118 may be selected according to particular implementations. The via waveguide tops and underlying waveguide vias are positioned to form a substantially solid circular wall within substrate 104 perpendicular to the surface of substrate 104. The resulting circular wall structure acts as a waveguide and is referred to herein as a "substrate integrated waveguide" (SIW) 170. Usually, each top touches a neighboring top. As described below, collectively the entirety of via waveguide vias in either region 108TX or 108RX provides a tapered waveguide to couple to interposers 114-1, 114-2 respectively. As used herein, the term "substantially solid" means the distance between neighboring waveguide vias is less than the diameter(s) of those vias. Accordingly, the distance between neighboring vias is smaller than a wavelength of mm-signals being transmitted and received by IC 102. In some examples, the diameter of the vias is approximately equal to or less than the pitch of the vias, such that the walls of adjacent vias are in contact with each other. In described examples, the central axis of the SIW is perpendicular to the surface of substrate 104. "Perpendicular" includes a range of +/−20 degrees from a 90-degree angle with the surface of substrate 104.

Within the interior of the circle presented by the via tops 118TX or 118RX are positioned four end-fed antennas. For example, transmit region 108TX has four transmit antennas 120TX1A, 120TX1B, 120TX2A and 120TX2B, each having a comparable and generally rectangular (with a rounded end) member physically positioned and aligned preferably 90 degrees apart from each other. Similarly, receive region 108RX has four receive antennas 120RX1A, 120RX1B, 120RX2A, and 120RX2B, each also physically positioned preferably 90 degrees apart from each other. As described below, for a set (either transmit or receive) of antennas, a coupler (e.g., branchline or other quadrature coupler within substrate 104), couples a differential signal between IC die 102 and a feed structure to those antennas, so that a circularly polarized signal is either transmitted by, or received from, the antennas. The signal is further guided by waveguides that include waveguide via tops 118, so that the signal is either transmitted to, or received from, a direction generally perpendicular from the plane illustrated in FIG. 2 (out of the page). Accordingly, the signal energy is efficiently coupled between substrate 104 and a respective cable assembly 106-x.

The diameter (D) 171 of transmit SIW 170, and similarly of the receiver SIW, is largely dependent on the wavelength (in the substrate) at the center frequency of operation but its actual values are determined based on many considerations. A first consideration is to ensure single-mode operation over the frequency band of interest. Higher order modes add to the signal loss, so the higher order modes need to be limited. Another consideration is to ensure appropriate lower frequency cut-off for the mode of interest so that the waveguide can support wave propagation in the frequency band of interest. Another consideration is to ensure linear group delay variation in the frequency band of interest, such that the SIV operates largely in the linear region of the dispersion curves for propagation constant vs. frequency. Another consideration is to ensure performance is optimum under all substrate manufacturing and system assembly tolerances. For example, a wider diameter may be needed to cover XY placement uncertainties of the interposer. While this example illustrates a circular SIW, the same considerations apply to the design of other shapes of SIVs, such as a rectangular SIW for linear polarized signals.

Figure 3:
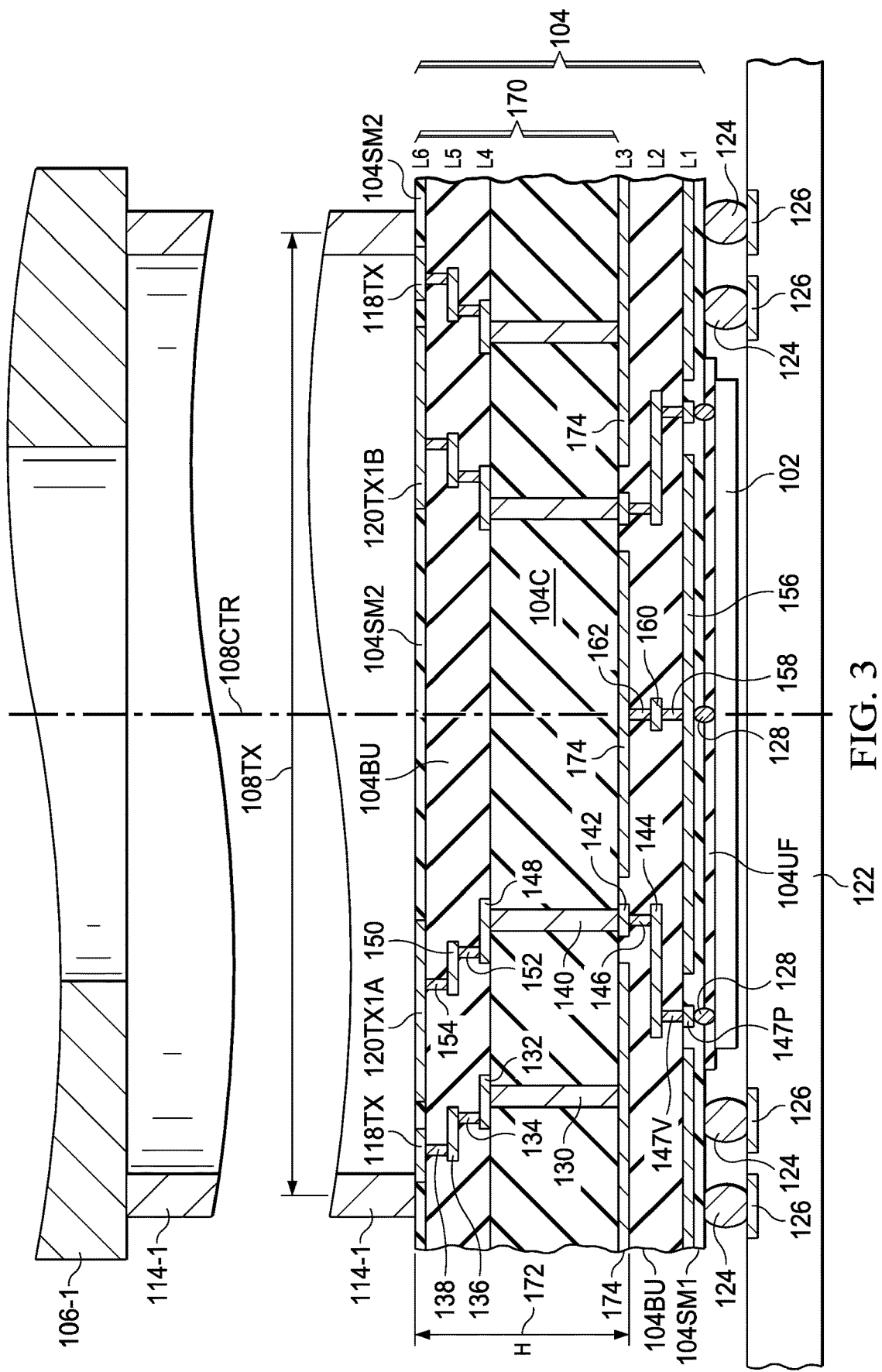
FIG. 3 is a cross-sectional view of portions of the system of FIG. 1.

FIG. 3 is a cross-sectional view of portions of system 100 taken in part along line 1C-1C, across region 108TX from FIG. 2. A similar view would be presented if taken across region 108RX. Generally, FIG. 3 shows substrate 104 physically and electrically connected to a circuit substrate 122, such as a printed circuit board (PCB). For example, this electrical connection may be accomplished using ball grid array (a) balls 124 connected to pads 126 on PCB 122. As described above, IC die 102 is connected electrically and physically beneath substrate 104. This electrical connection may be achieved electrically by die bumps such as copper pillars 128 between IC conductive areas 110 and contacts (see FIG. 1) along a bottom of substrate 104, and the physical connection by various die bonding techniques, such as thermo-compression. Also, an underfill 104UF is placed between die 102 and substrate 104. Dashed vertical lines in the top left and right of FIG. 3 indicate a desired position for interposer 114-1, which may be affixed relative to an upper surface of substrate 104, encircling transmit region 108TX. An electrically conductive outer surface of interposer 114-1 is either directly in contact with via tops 118TX or with a slight air gap (e.g., 0.1 mm) between the two structures.

Multilayered substrate 104 has a cross-sectional profile generally consistent with evolving technologies for substrate packaging. In the illustrated example, substrate 104 includes six metal layers, referenced in ascending order from the bottom of substrate 104 upward, as layers L1 through L6. Also, for example, each metal layer L1 through L6 may have a same thickness (such as 15 µm), although metal layer thickness may vary, but desirably (for thermal expansion matching) with a same thickness for each layer a same distance from center core 104C (layers L3 and L4 having a same thickness; layers L2 and L5 having a same thickness; layers L1 and L6 having a same thickness). Between successive metal layers are non-conducting materials, which are not referred to herein as layers, but which are also layered (structurally) as between metal layers. For example, a center core 104C exists between metal layers L3 and L4, which is thicker than the non-conducting materials between other metal layers. Also, for example, center core 104C may be 200 µm thick, while the non-conducting materials between other metal layers (usually referred to as build-up 104BU) may be 30 µm thick. Build-up 104BU is desirably a material with low loss, and with each layer of such material having a same or similar dielectric constant. Solder masks 104SM1 and 104SM2 are respectively below metal layer L1 and above metal layer L6.

FIG. 3 also illustrates additional structure (in substrate 104) that form a portion of SIW waveguide 170 that terminates at via tops 118TX in FIG. 2. Specifically, a via 130 is formed through center core 104C, such as forming a cylindrical void through core 104C and then filling and/or plating it with a conductive material (e.g., metal), where the void has a cross-sectional diameter of 90 µm in this example. Via 130 also provides electrical contact to metal in layer L3. Above via 130, metal layer L4 is patterned to form a pad 132, such as with a circular perimeter and a diameter of 130 µm. A build-up 104BU is formed over pad 132 (and above other portions of metal layer L4), and a via 134 is formed in that build-up (e.g., forming a cylindrical void through the build-up above layer L4, and filling or plating it with conductive material). Via 134 may have a cross-sectional diameter of 60 μm, and it provides electrical contact to pad 132. Similarly, above via 134, metal layer L5 is patterned to form a pad 136 of like shape, but smaller diameter (e.g., equal to 100 μm), than pad 132. A build-up 104BU is formed over pad 136 (and above other portions of metal layer L5), and a via 138 is formed in that build-up 104BU, with a same technique and diameter as via 134. Also, metal layer L6 is patterned to form waveguide top 118TX, in physical and electrical contact to via 138. Accordingly, waveguide top 118TX is part of a physical SIW 170 structure, and electrical path, that includes the various items and paths through at least metal layers L6 to L3. Further, that structure and path are tapered so that: near the bottom of substrate 104, the shape/path starts nearer to the center 108CTR of region 108TX; and moving upward, it bends radially outward from that center. This same structure is repeated for each waveguide top 118TX, again referring to FIG. 2. The example illustration has a number of waveguide tops 118TX inside but adjacent the perimeter in transmit region 108TX, thereby collectively forming a substrate-integrated, communication region (either transmit or receive) waveguide 170 having a substantially solid wall. Specifically, each waveguide top 118TX corresponds to a structure as shown in FIG. 3, tapering from the top downward and toward the center of the transmit region. The combination of all such structure, across all perimeter-positioned vias, provides a generally funnel-type physical profile within substrate 104, widest at the top of substrate 104 (e.g., at layer L6), and tapering inward toward the bottom of substrate 104 (e.g., at layer L3). Further, a generally circular (or piecewise linear approaching a circle) outer boundary may be defined along the outermost tangent of the circular shape of each waveguide top 118TX. That outer boundary generally aligns within, or coincides with, the perimeter of interposer 114-1.

A region of layer L3 within the perimeter of SIW 170 is left essentially solid, except for feed-through vias for the antenna signals, to thereby form a reflector surface 174. Vias 130 contact reflector surface 174 to form an essentially closed end to SIW 170. Core 104C and build up 104BU is selected to have a respective thickness so the height (h) 172 of SIW 170 is equal to approximately one fourth the wavelength ($\lambda/4$) of the transmission signal that is produced by IC 102 as it propagates through the substrate 104. Because the dielectric constant of the substrate is higher than that of air, the value of $\lambda/4$ within the substrate is somewhat different from that in air. The presence of the metal layers also affects $\lambda/4$. Therefore, for most of the cases it is difficult to exactly match that distance because of manufacturing limitations or slight differences in the dielectric constant specified so the distance is approximately $\lambda/4$ and the reflection then is not perfect. Therefore, height 172 is designed to be approximately $\lambda/4$, where "approximately $\lambda/4$" covers a range of +/−10% $\lambda/4$. A given substrate may also be designed to support a band of frequencies, such as the 110-140 GHz band. Therefore, in some examples height 172 may be selected to within +/−10% $\lambda/4$ for a band of frequencies within the substrate. In another example, height 172 may be selected to within +/−20% $\lambda/4$ for a band of frequencies within the substrate.

Accordingly, as signals are transmitted by antennas 120TX, a portion of the radiated signal is launched from the front side of the antennas, enters interposer waveguide 114-1, and travels to DWG 106-1. Another portion of the radiated signal is launched from the backside of the antennas and is therefore referred to as "back-scatter." The back-scatter radiation enters the funnel-type substrate integrated waveguide 170, which guides the back-scatter signal wave generally in a direction perpendicular from the upper surface of substrate 104 until it reaches reflector 174. The back-scatter signal is then reflected and guided back up and into the interior of interposer 114-1 by SIW 170. Since the reflection produces a 180-degree phase shift ($\lambda/2$), and the height 172 of SIW 170 is $\lambda/4$, the reflected signal arrives in-phase with the front signal after traveling down and back. The reflected back-scatter signal then enters interposer 114.1 and combines with the front signal to boost the signal that is being delivered to DWG 106-1 from antenna 120TX. Tapered SIW 170 thereby reduces loss as the signal passes between mismatched impedance materials of the interposer and substrate.

Although such waveguide structure and functionality are described above with respect to the transmit region 108TX, the receive region 108RX (in an example embodiment) has the same structure. Accordingly, as a signal wave is received from interposer 114-2, a portion of that signal that is not absorbed by the receiver antenna is guided downward through substrate 104, by the inward tapering of a funnel-like SIW waveguide therein, reflected, and then guided back to the receiver antenna and thereby to IC die 102.

FIG. 3 also illustrates additional a feed structure in substrate 104 that feeds the illustrated transmit antennas 120TX1A and 120TX1B (applying likewise to antennas 120TX2A and 120TX2B, which are not visible in the cross-section). Specifically, a via 140 is formed through center core 104C, which may be formed of same dimensions and materials, and concurrently with, via 130 described above in connection with via waveguide top 118TX. Via 140 also provides electrical contact to metal in layer L3, where a metal pad 142 is formed in layer L3 by forming an annulus opening in metal layer L3, so metal pad 142 remains at the center of the annulus, with an open area in metal layer L3 (eventually filled with build-up) concentrically around metal pad 142. In this way, the antenna-related structure is otherwise isolated from other connections to layer L3, permitting a signal path connection by way of a signal coupler, described below. Also, in this regard, metal pad 142 is connected to a conductor portion 144 of metal layer L2, by way of a via 146. Conductor portion 144 is a part of the signal coupler, which communicates with IC die 102 by an additional via 147V and metal layer L1 pad 147P. Returning to via 140, above it metal layer L4 is patterned to form a pad 148, metal layer L5 is patterned to form a pad 150, and respective layer L4-to-L5 and L5-to-L6 vias 152 and 154 are formed through build-up 104BU, all of which may be comparably and concurrently formed with respective metal layer (and build-up) formation of horizontally co-planar structure described above in connection with via waveguide top 118TX. Via 154 thus provides electrical contact to transmit antenna 120TX1A, completing the structure and electrical path for that antenna in substrate 104. Accordingly, below transmit antenna 120TX1A in substrate 104, an overall physical antenna feed structure provides an electrical path through various items and includes at least metal layers L5 to L2. Preferably, this structure has a total vertical height, from the top of metal layer L3 to the bottom of metal layer L6, of $\lambda/4$, where $\lambda$ is the wavelength of the signal to be transmitted/received by antennas 120TX, 120RX. Further in this regard, for applications at even higher frequencies, $\lambda$ is therefore proportionately reduced, allowing the antenna height to reduce and be built with less space inside substrate 104; in such an example, extra room in substrate may be available for embedding IC die 102 internally within substrate 104, rather than being physically attached to an exterior surface (e.g., to the bottom) of substrate 104. Further, the antenna structure includes portions nearer the substrate lower surface (pad 142 and via 140) that are nearer to the center 108CTR of region 108TX than other portions that extend toward the substrate upper surface. Such a structure may reduce loss from signal communication and avoid or minimize the effects of impedance mismatch incurred in the transmitting (or receiving) signal paths. However, as the structure and signal path is considered vertically upward through substrate 104, the final signal transmitting (or receiving in the case of region 108RX) portion of transmit antenna 120TX1A is more favorably distanced from transmit antenna 120TX1B (and from the other two transmitting antennas 120TX2A and 120TX2B), thereby reducing possible cross-talk between transmitted (or received) signals. Although such antenna structure and functionality are described above with respect to the transmit region 108TX, the receive region 108RX (in an example embodiment) has the same structure.

FIG. 3 also illustrates additional structure in substrate 104 that forms a signal block structure, preferably connecting metal layer L1, usually electrically grounded, to metal layer L3. Specifically, such structure includes a metal pad 156 in layer L1, a via 158 from metal pad 156 to a layer L2 metal pad 160, and a via 162 from metal pad 160 to the general plane of layer L3. This structure is repeated and positioned in numerous selected locations between the four signal antennas.

Figure 4:
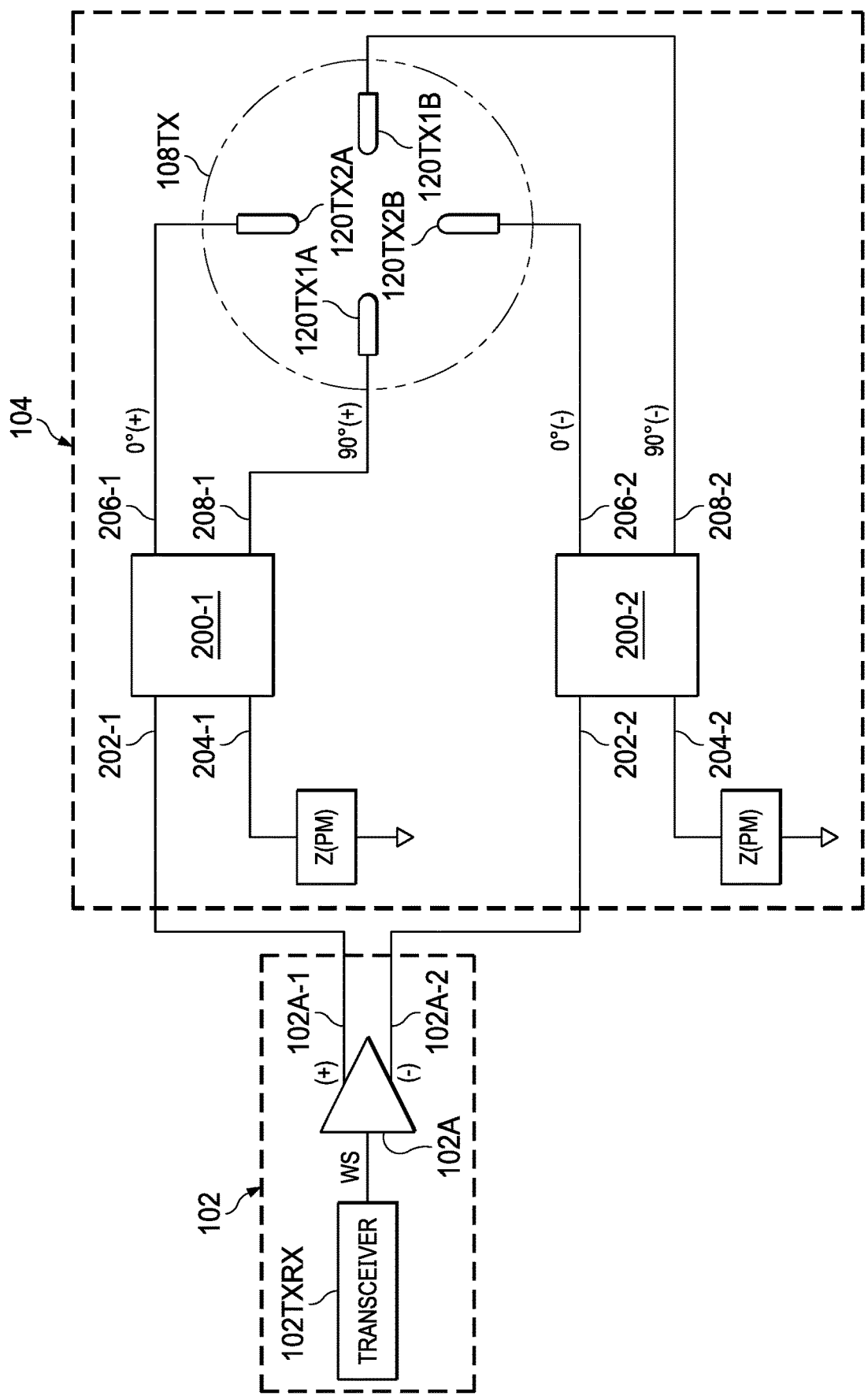
FIG. 4 is a schematic diagram for a portion of the DWG communication system of FIG. 1.

FIG. 4 is a schematic diagram of a signal path from IC die 102, through two branchline couplers 200-1 and 200-2, to the four transmit antennas 120TX1A, 120TX1B, 120TX2A, and 120TX2B of region 108TX (FIG. 2). Transceiver 102TXRX (FIG. 1) includes various circuitry for transmitting and receiving a millimeter-wave signal, such as from a differential amplifier 102A. Differential amplifier 102A provides differential outputs 102A-1 and 102A-2, which are shown in FIG. 4 with a respective (+) and (−) designation, depicting the differential nature of the output and depicting that the outputs signals are out of phase by 180 degrees. Output 102A-1 is connected to input 202-1 of coupler 200-1, and output 102A-2 is connected to input 202-2 of coupler 200-2. Isolated ports 204-1 and 204-2, of couplers 200-1 and 200-2, respectively, are connected through a matched termination impedance (e.g., Z(PM)) to ground. Output 206-1 of coupler 200-1 is connected to antenna 120TX2A, and output 208-1 of coupler 200-1 is connected to antenna 120TX1A, which is both physically oriented and electrically coupled to provide a signal, 90 degrees apart from a concurrent signal from antenna 120TX2A. Output 206-2 of coupler 200-2 is connected to antenna 120TX2B, and output 208-2 of coupler 200-2 is connected to antenna 120TX1B, which is both physically and electrically coupled to provide a signal, 90 degrees apart from a concurrent signal from antenna 120TX2B.

Within IC die 102, transmitter circuitry generates a millimeter wave signal WS, which is output to differential amplifier 102A. In response, amplifier 102A outputs 180-degree separated versions of the input signal (possibly filtered and/or amplified) at its differential outputs 102A-1 and 102A-2. Each of branchline couplers 202-1 and 202-2 operates to receive one input and to produce corresponding 90-degree phase separated outputs. With respect to branchline coupler 200-1, its two outputs are shown at 0° (+) and 90° (+), indicating correspondence to the (+) signal of output 102A-1, and being 90 degrees separated from one another. Thus, output 0° (+) may be perceived as a first unit-length vector located at 0 degrees in a positive direction (usually to the right of the origin in polar coordinates), and output 90° (+) may be perceived as a second unit-length vector located at +90 degrees relative to the first vector. Similarly, with respect to branchline coupler 200-2, its two outputs are shown at 0° (−) and 90° (−), indicating correspondence to the (−) signal of output 102A-2, and being 90 degrees separated from one another. Thus, output 0° (−) may be perceived as a third unit-length vector located at 0 degrees in a negative direction (usually to the left of the origin in polar coordinates), and output 90° (−) may be perceived as a fourth unit-length vector located at either −90 degrees relative to the first vector or +90 degrees relative to the third vector. Accordingly, collectively FIG. 4 encodes the input signal into four waveform vectors, each spaced equally at 90-degree distances, and so that each of four different 90-degree positions is occupied by a respective waveform vector. Accordingly, the four FIG. 3 antennas collectively produce a circular polarization output, so that as the input millimeter wave signal WS to amplifier 102A varies, each of the resultant four vectors has a constant magnitude, but rotates with time in a plane perpendicular to the plane along which the tops of transmit antennas 120TX1A, 120TX1B, 120TX2A and 120TX2B are aligned. With reference to FIG. 1, the circular polarization signal rotates perpendicularly upward from substrate 104, and into the interior of interposer 114-1. Rotation may be either left-handed or right-handed polarization. In a similar but reverse direction, receive antennas 120RX1A, 120RX1B, 120RX2A and 120RX2B are configured to receive four signal components (one per antenna) of a circular polarization signal from interposer 114-2, and those signal components are connected to comparable components as FIG. 4 in reverse direction, so as to decode from the signal components a corresponding output signal representative of the received millimeter wave signal.

The circular polarization achieved by the described physical and electrical structure for an example embodiment provides various benefits. In contrast, for proper signal communication, linear polarization requires a fairly precise planar linear alignment with the signal and a receiver of that signal. Also, in contrast, the example embodiment provision of circular polarization removes the need for such planar alignment. For example, with respect to FIG. 1, as a DWG cable assembly 106-x is positioned relative to substrate 104, the circular cross-section of the cable is not required to be rotationally aligned to a particular position relative to substrate 104 for signal communication purposes. Accordingly, rotational independence is achieved about the axis of each cable, relative to the transmit/receive structure in substrate 104. As another example, the circularly-polarized signal incurs less signal loss in certain environments, such as those with vibrations, turns, or gaps in connectivity.

Additional details of an example antenna structure and phase splitter are described in U.S. patent application Ser. No. 16/393,809, entitled Circularly-Polarized Dielectric Waveguide Launch for Millimeter-Wave High-Speed data Communication," filed Apr. 24, 2019, which is incorporated by reference herein.

Figure 5:
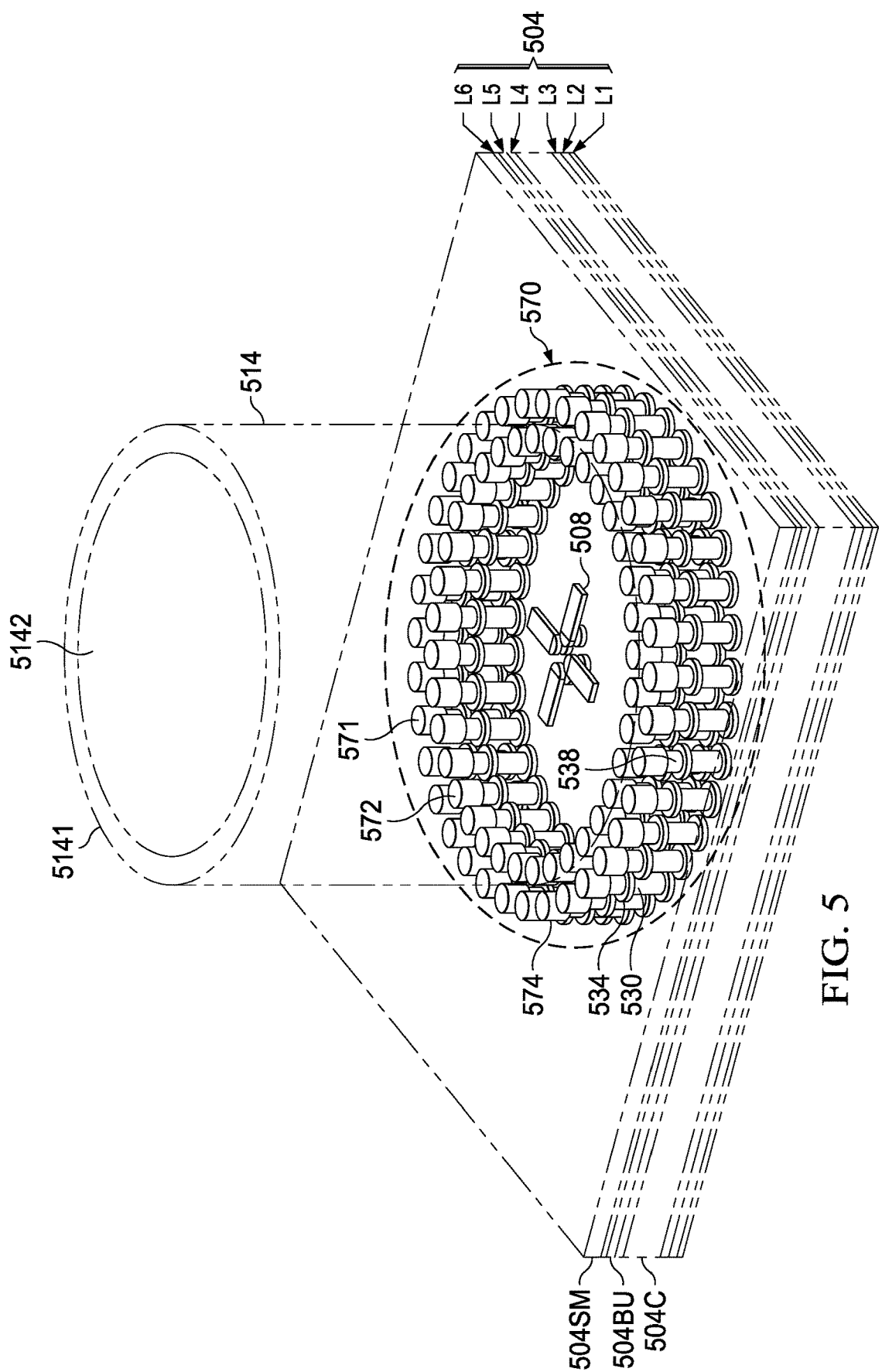
FIG. 5 is a perspective view of a portion of another example substrate for a DWG communication system.

FIG. 5 is a perspective view of a portion of another example substrate for a DWG communication system that is similar to DWG communication system 100 of FIG. 1. Antenna 508 is representative of either a transmitter antenna or a receiver antenna for circularly polarized signals. In this example, SIW 570 is constructed in a similar manner as the SIW illustrated in FIGS. 2-3 using closely spaced stacked vias, such as vias 530, 534, 538 to form a circular ring of vias 571 in the core 504C and buildup layers 504BU of multilayer substrate 504 between metal layers L3-L6. However, in this example, a second row of stacked vias form a second circular ring of vias 572. Together, circular ring of vias 571 and 572 act together to form a more solid conductive wall for SIW 570.

In this example, the stacked vias such as vias 530, 534, 538 are all inline to form a straight walled SIW 570, rather than being offset to form a tapered SIW as illustrated in FIG. 3, by vias 130, 134, 138.

Interposer waveguide 514 has an electrically conductive outer wall 5141. The hollow interior 5142 is filled with air in this example, which is a dielectric. In another example, interposer waveguide 514 may have a solid dielectric core rather than being hollow. In another example, interposer waveguide 514 may be filled with another type of dielectric gas or liquid. In either case, the electrically conductive outer wall 5141 is coupled to the exposed top edge of SIW 570. In this example, the top edge of SIW 570 is exposed by openings in the solder mask layer 504SM, as indicated at 574. In this example, each opening 574 is filled with electrically conductive epoxy to permanently couple the conductive wall 5141 of interposer 514 to the top edge of SIW 570.

Figure 6A:
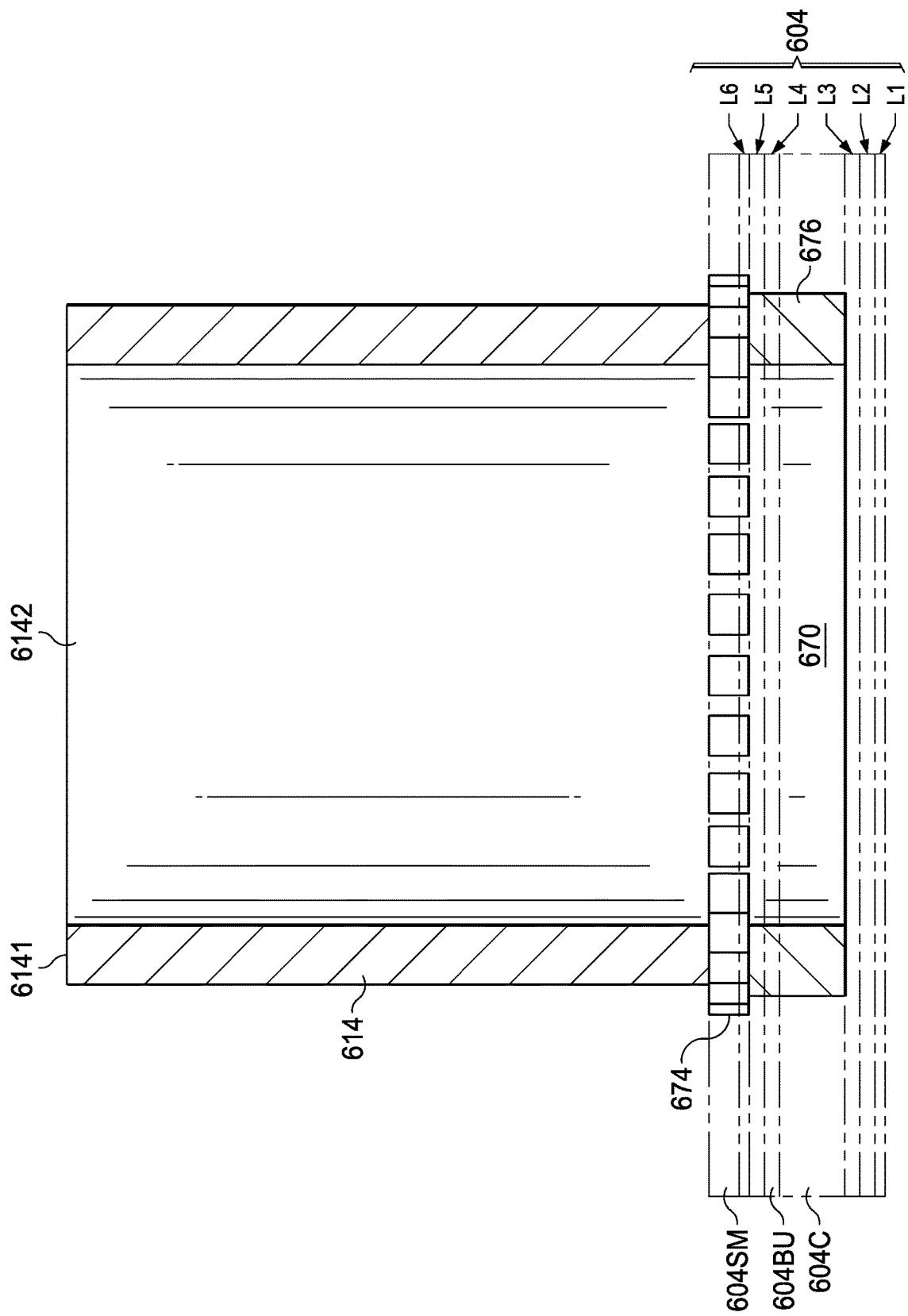
FIGS. 6A, 6B are respective side and perspective views of a portion of another example substrate for a DWG communication system.
Figure 6B:
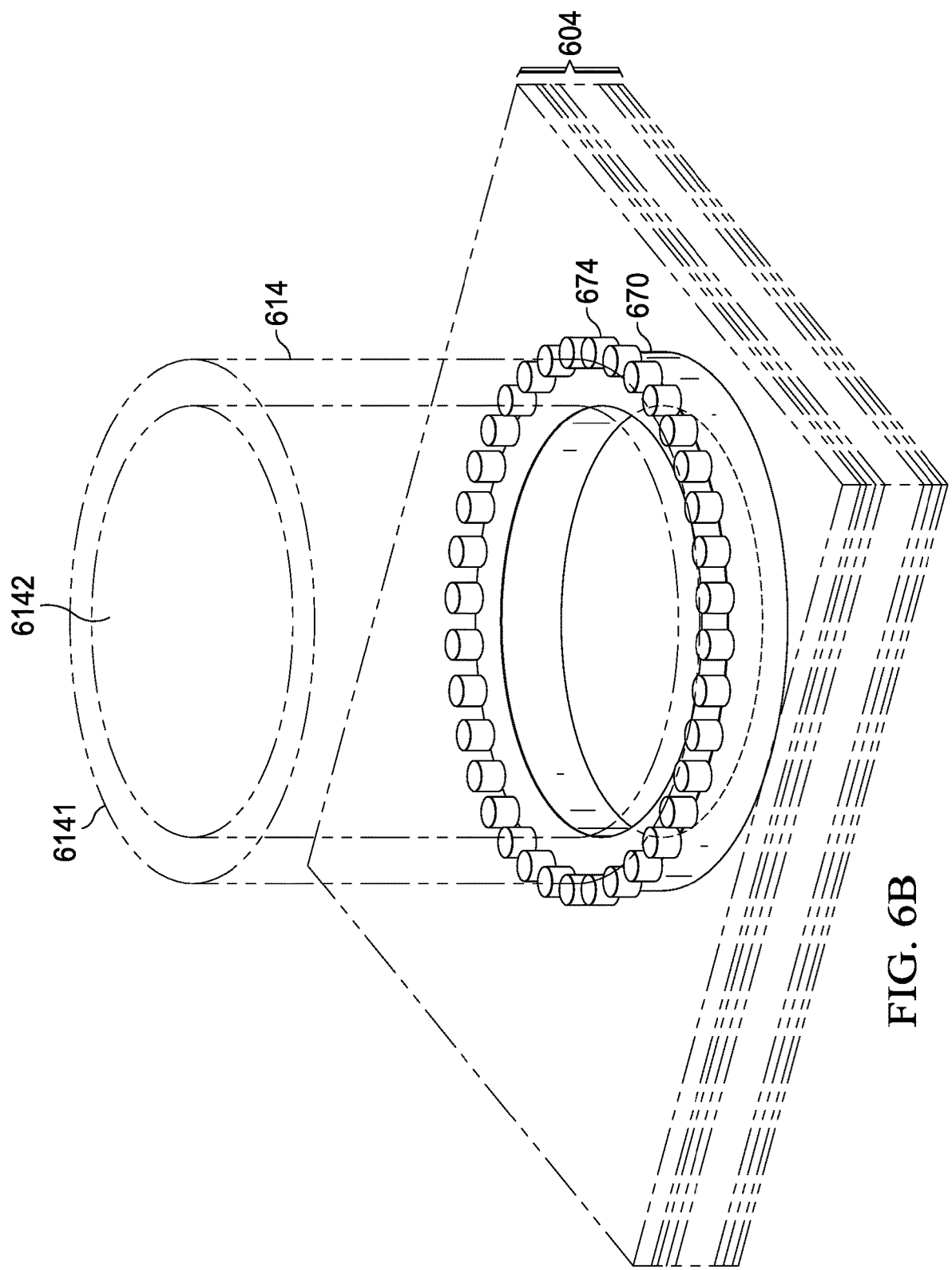

FIGS. 6A, 6B are respective side and perspective views of a portion of another example multilayer substrate 604 for a DWG communication system, such as system 100 of FIG. 1. In this example, SIW 670 is a solid ring of material that is placed in a circular trench 676 that is milled through the core 604C and buildup 604BU layers of multilayer substrate 604. In this example, trench 676 is milled using a rotating cutter. In another example, a known or later developed chemical or plasma etching process may be used to form a circular trough in multilayer substrate 604. After trench 604 is milled out, a conductive material is then inserted into the trench to form solid wall SIW 670. In this example, the conductive material is applied using an electroplating process. In another example, known or later developed techniques may be used to create a solid SIW within trench 676 of multilayer substrate 604. For example, a conductive slurry may be used to fill the trench. In another example, an additive manufacturing process that uses three-dimensional printing technology may be used to fill the trench.

Interposer waveguide 614 has an electrically conductive outer wall 6141. The hollow interior 6142 is filled with air in this example, which is a dielectric. In another example, interposer waveguide 614 may have a solid dielectric core rather than being hollow or be filled with another type of dielectric gas or liquid. In either case, the electrically conductive outer wall 6141 is coupled to the exposed top edge of SIW 670. In this example, the top edge of SIW 670 is exposed by openings in the solder mask layer 604SM, as indicated at 674. In this example, each opening 674 is filled with electrically conductive epoxy to permanently couple the conductive wall 6141 of interposer 614 to the top edge of SIW 670.

Figure 7:
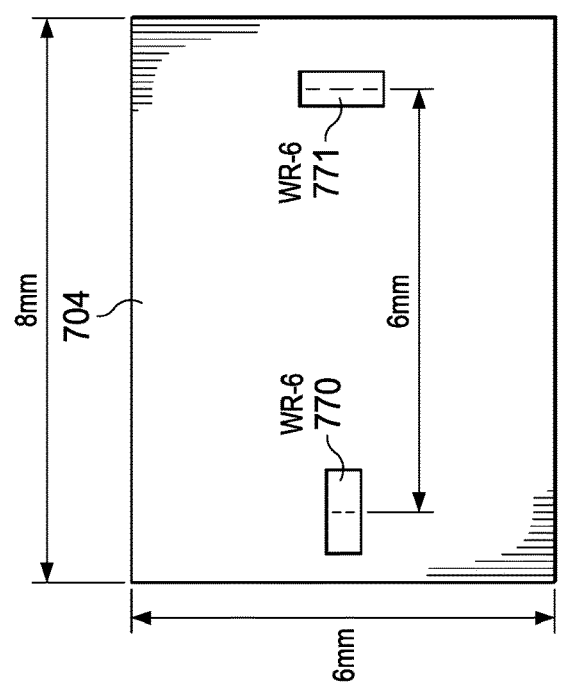
FIG. 7 is a top view of a portion of another example substrate for a DWG communication system.

FIG. 7 is a top view of a portion of another example multilayer substrate 704 for a DWG communication system. In this example, rectangular shaped DWG cables are used to transport linearly polarized signals, therefore SIWs 770, 771 are rectangular instead of round. Rectangular interposer waveguides (not shown) will then be coupled to exposed edges of SIW 770, 771. In order for an interposer to provide a standardized interface, it may be useful to define a set of waveguide dimensions that are appropriate for various frequencies. For example, various sizes of waveguides have been standardized by the Electronic Industries Alliance (EIA) RS-261-B, "Rectangular Waveguides (WR3 to WR2300) to promote interchangeability of metallic waveguides. WR-6 (rectangular waveguide) is a standard dimension (approximately 0.83×1.7 mm) for a band of operation of approximately 110-170 GHz. WR-5 is a standard dimension (approximately 0.65×1.3 mm) for 140-220 GHz. In this example, waveguide regions 770, 771 have a rectangular cross section and are sized to the WR-6 standard for operation in the 110-170 GHz band. Other example interposers may include waveguide regions with larger or smaller standard sizes for systems operating in different frequency bands.

Rectangular SIW 770, 771 are fabricated in a similar manner as described above for fabricating circular SIW 170 using one or multiple rows of closely spaced vias or using a milled slot that is filled with a conductive material to form a waveguide having a substantially solid wall.

Figure 8:
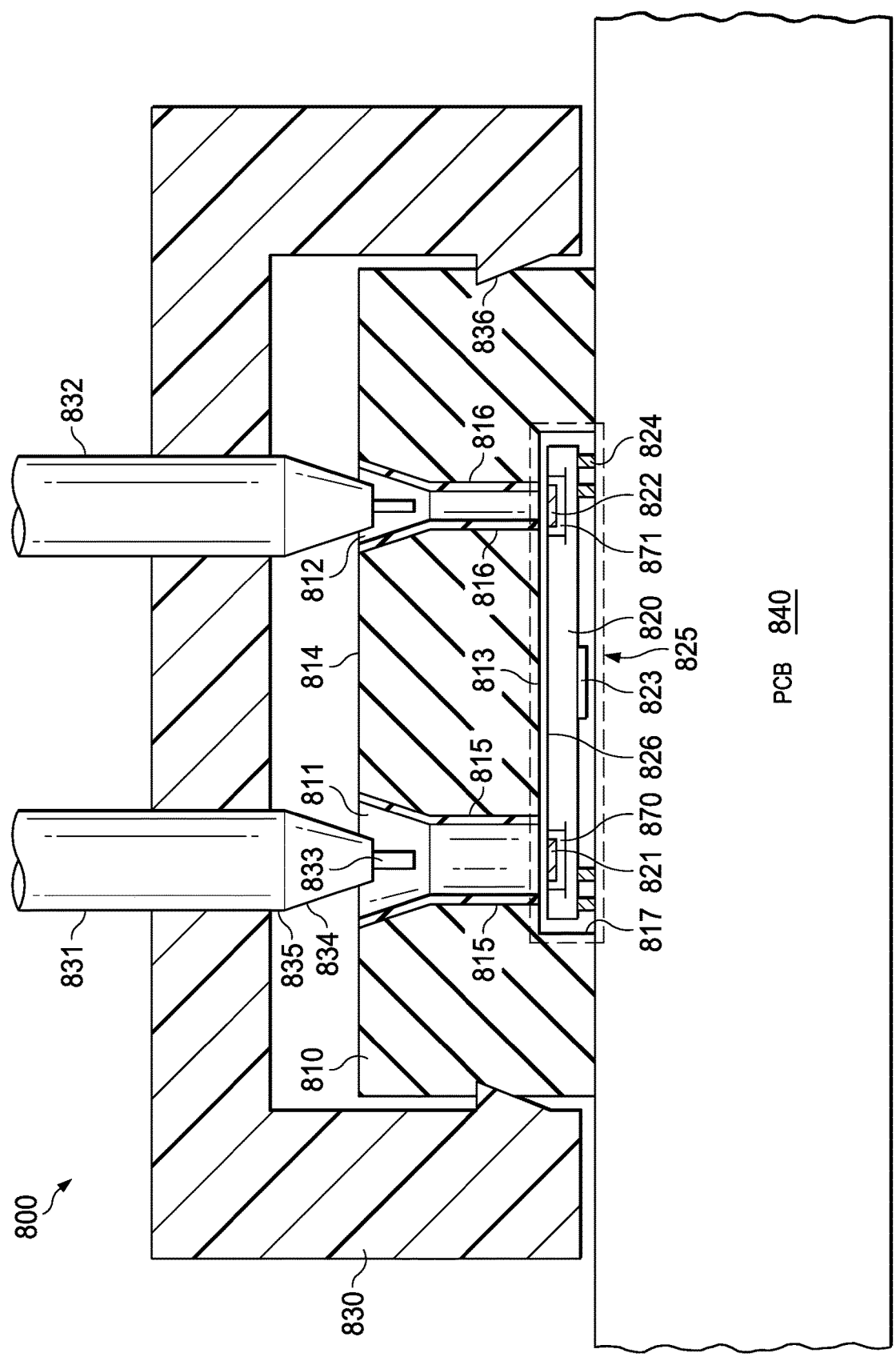
FIG. 8 is a cross-sectional view of a portion of an example system that includes an interposer located between radiating elements of a microelectronic device and a DWG.

FIG. 8 is a cross-sectional view of a portion of an example system 800 that includes an interposer 810 located between antennas 821, 822 of a microelectronic device 825 and a dielectric waveguide interconnect 830. In this example, antenna 821 is a transmitting antenna and antenna 822 is a receiving antenna. However, in other examples, there may be two or more transmitting antennas, two or more receiving antennas, or various combinations.

In this example, antennas 821, 822 are quadrature antennas sized to launch or receive circularly polarized radio frequency (RF) signals having a frequency in the range of approximately 110-140 GHz. However, in other examples higher or lower frequencies may be used by sizing antennas 821, 822 appropriately. As used herein, the term "antenna" refers to any type of radiating element or launch structure that is useful for launching or receiving high frequency RF signals.

Substrate integrated waveguides 870, 871 are fabricated within substrate 820 as described in more detail hereinabove with regard to FIGS. 1-7. In this example, SIW 870, 871 are circular and are fabricated using stacked vias to form substantially solid walls, as described with regard to FIG. 4. In another example, SIW 870, 871 may be fabricated as a solid wall as described with regard to FIGS. 6A, 6B. In another example, SIW 870, 871 may have a rectangular shape, or another shape that is appropriate for the type of RF signal that is being transmitted.

In this example, BGA substrate 820 provides a substrate onto which IC die 823 is mounted in a "dead bug" upside down manner. Antennas 821 and 822 are fabricated on the top side of BGA substrate 820 by patterning a copper layer using known or later developed fabrication techniques. In this example, IC die 823 includes a transmitter and a receiver that are coupled to respective transmitter antenna 821 and receiver antenna 822 by differential signal paths that are fabricated on BGA substrate 820. Solder balls 824 are used to connect signal and power pads on BGA substrate 820 to corresponding pads on substrate 840 using a known or later developed solder process.

BGA substrate 820 and IC die 823 together may be referred to as "BGA package," "IC package," "integrated circuit," "IC," "chip," "microelectronic device," or similar terminology. BGA package 825 may include encapsulation material to cover and protect IC die 823 from damage.

While IC die 823 is mounted in a dead bug manner in this example, in other examples an IC containing RF transmitters and/or receivers may be mounted on the top side of BGA substrate 820 with appropriate modification to interposer 810 to allow for mechanical clearance. In this example, IC die 823 is wire bonded to BGA substrate 820 using known or later developed fabrication techniques. In other examples, various known or later developed packaging configurations, such as QFN (quad flat no lead), DFN (dual flat no lead), MLF (micro lead frame), SON (small outline no lead), flip chips, dual inline packages (DIP), etc., may be attached to a substrate and coupled to one or more antennas thereon.

Substrate 840 may have additional circuit devices mounted on it and interconnected with BGA package 825. Substrate 840 may be single sided (one copper layer), double sided (two copper layers), or multi-layer (outer and inner layers). Conductors on different layers may be connected with vias. In this example, substrate 840 is a printed circuit board (PCB) that has multiple conductive layers of that are patterned using known or later developed PCB fabrication techniques to provide interconnect signal lines for various components and devices that are mounted on substrate 840. Glass epoxy is a primary insulating substrate; however various examples may use various types of known or later developed PCBs. In other examples, substrate 840 may be fabricated using various known or later developed techniques, such as from ceramic, a silicon wafer, plastic, etc.

Interposer 810 is a block of material that is shaped to provide a well-defined reference plane 813 that is positioned adjacent a top surface 826 of BGA substrate 820. A second well defined reference plane 814 is positioned adjacent DWG interconnect 830. In this example, interposer 810 includes two defined regions 811, 812 that form interface waveguides between reference plane 813 and reference plane 814. In this example, interposer waveguide regions 811, 812 are open and therefore filled with air, or other ambient gas or liquid. In this example, interposer waveguide regions 811, 812 are lined with a conductive layer 815, 816 such that interface waveguide regions 811, 812 act as metallic waveguides. In another example, interposer waveguide regions 811, 812 may be filled with a dielectric material to act as dielectric waveguides. In this example, interposer 810 is fabricated from an electrically non-conductive material, such as plastic, epoxy, ceramic, etc.

In another example, a portion of the interposer 810 between the antennas 821, 822 and/or a portion of substrate 840 between antennas 821, 822 may be defined using a photonic bandgap (PBG) structure. Fabrication of PBG structures are described in more detail in U.S. patent Ser. No. 10/371,891, issued 2019 Aug. 6, entitled "Integrated Circuit with Dielectric Waveguide Connector Using Photonic Bandgap Structure," which is incorporated by reference herein. The purpose of the PBG is to create a high impedance path that avoids or diminishes the wave propagation between two points (or areas). In this particular application it is desirable to reduce the crosstalk and increase isolation between the transmitter antenna 821 and receiver antenna 822. A portion of the interposer material may include a matrix of interstitial nodes that may be filled with a material that is different from the bulk interposer material. The nodes may be arranged in a three-dimensional array of spherical spaces that are in turn separated by a lattice of interposer material. The photonic bandgap structure formed by periodic nodes may effectively guide an electromagnetic signal through the PBG waveguide.

Interposer waveguides 811, 812 may have a circular cross-section, for example, for circularly polarized signals. In another example, interposer waveguides 811, 812 may have a rectangular cross-section. The long side of this cross-section may be twice as long as its short side, for example. This is useful for carrying electromagnetic waves that are horizontally or vertically polarized. For sub-terahertz signals, such as in the range of 130-150 gigahertz, a waveguide dimension of approximately 1.5 mm×3.0 mm works well.

Interposer 810 includes a cavity 817 that is designed to allow the interposer to rest solidly on substrate 840 while leaving a small gap between the top surface 826 of BGA package 825 and surface 813 of interposer 810. In this manner, BGA package 825 is isolated from stress or movement of interposer 810 that might affect the connection reliability of solder balls 824.

DWG interconnect 830 is shaped to couple to interposer 810 in order to align one or more DWG, such as DWG 831, 832, with waveguide regions 811, 812. Each DWG 831, 832 includes a core 833 and a cladding 834. In this example, each DWG 831, 832 also is covered by an external shield material 835 to provide protection from abrasion.

At reference plane 813, waveguide regions 811, 812 are sized to approximately match the characteristic impedance of antennas 821, 822 in order to provide a good coupling efficiency. At reference plane 814, waveguide regions 811, 812 flare out to provide a transition to DWG 831, 832 in order provide a good coupling efficiency to DWG 831 832.

A signal may be launched into interposer waveguide 811 by transmitter antenna 821 that is generated by a transmitter circuit in IC die 823 using known or later developed techniques. Interface waveguide 811 may then conduct the signal to reference plane 814 on the other side of interposer 810 with minimal radiation loss. In this manner, insertion loss between a transmitter on IC 823 and DWG 831 may be held to an acceptable level. For example, if a communication link has a total insertion loss budget of 22 dB, maintaining the insertion loss from the transmitter within IC 823 to DWG 831 to less than 3 dB is desirable. Similarly, maintaining the insertion loss from the DWG 832 to the receiver within IC 823 to less than 3 dB is desirable. Even if a system has a higher loss budget than 22 dB, it may be desirable that insertion losses of the transitions should not exceed a modest percentage of the loss budget, such as ten percent.

DWG interface 830 may include an interlocking mechanism that may interlock with interposer 810 to thereby hold DWG interface 830 securely in place. In this example, DWG interface 830 includes a socket configuration that mates with interposer 810. The interlocking mechanism may be a simple friction scheme, a ridge or lip that interlocks with a depression on interposer 810, or a more complicated known or later developed interlock scheme. In this example, barbs 836 protrude from DWG interface 830 to mechanically interact with interposer 810. In other examples, DWG interface 830 may have a different configuration. For example, DWG interface 830 may be screwed onto substrate 840 or interposer 810, may snap onto interposer 810, may be soldered down to the PCB 840, etc.

In this manner, an interposer that acts as a buffer zone is used to establish two well defined reference planes that can be optimized independently. A first plane is located between the radiating elements and the interposer and a second plane is a surface between the interposer and the DWG interconnect. The interposer allows for the introduction of features that improve the isolation between transmitter and receiver antennas in the device, relax the alignment tolerances, and enhance the impedance matching between the antennas and the dielectric waveguide.

Figure 9:
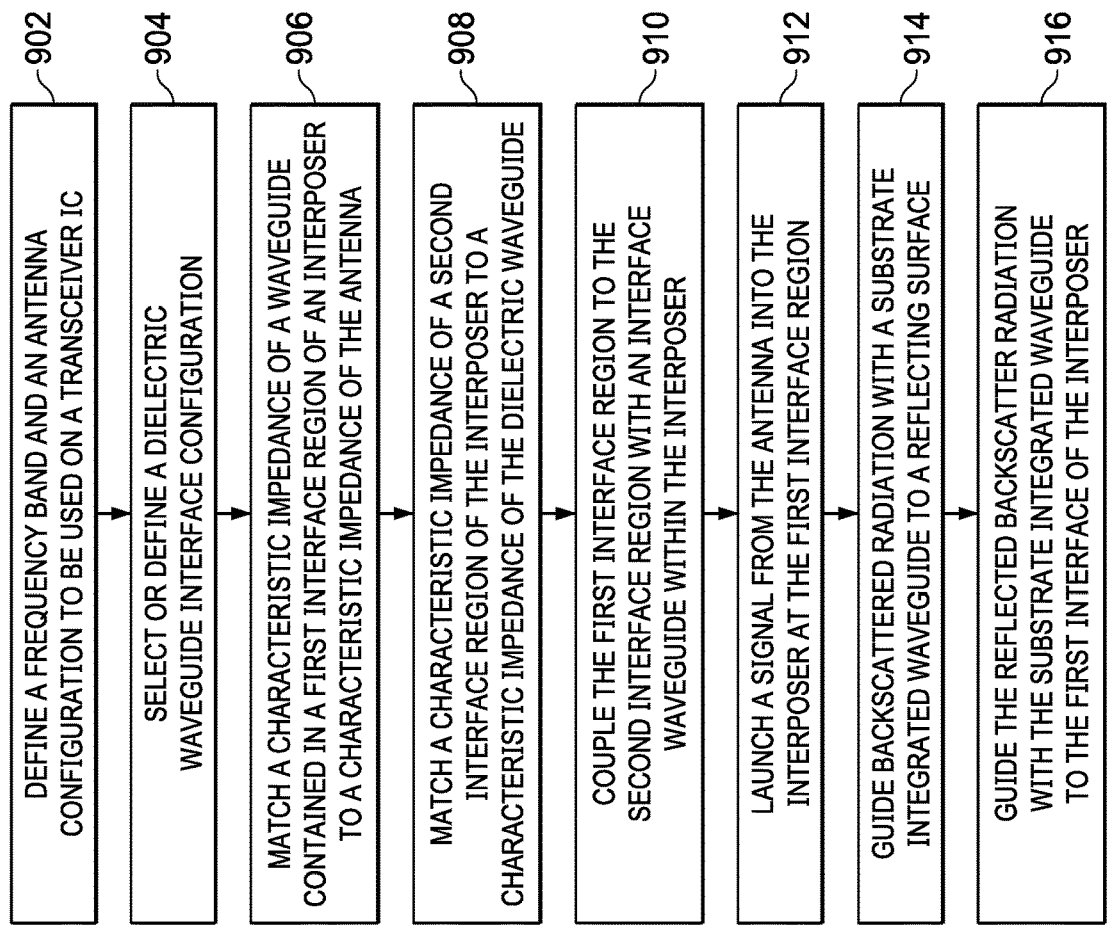
FIG. 9 is a flow chart illustrating operation of a dielectric waveguide system.

FIG. 9 is a flow diagram of a method of interfacing a dielectric waveguide to an antenna on an integrated circuit using in interposer. A dielectric waveguide system, such as DWG system 100 (FIG. 1), may be operated in this manner.

At 902, a frequency band and an antenna configuration are selected or defined to be used on a transceiver IC. For example, it may be decided that a transceiver IC will operate in the 120-140 GHz band of RF. A quad antenna configuration may be selected for a transmit antenna and a receive antenna for circularly polarized signals, as described in more detail with reference to FIGS. 2-4. The antennas may be designed to have a characteristic impedance using known or later developed antenna design techniques.

At 904, a dielectric waveguide interface configuration is selected from a group of available options or a new DWG interconnect structure is designed. Usually, the core size and shape, cladding thickness, and dielectric constants of the core and cladding will determine a characteristic impedance of the DWG.

An interposer is inserted between the transceiver IC and the DWG interconnect structure and provides two reference planes that may be optimized for respective interfaces. At 906, an impedance of an interposer waveguide contained in a first interface region of the interposer is matched to an impedance of the antenna. This may be done by selecting a size and configuration and material for use in the interposer and the interface waveguide region. For example, to match the 110-140 GHz band of operation for the transceiver IC using circularly polarized transmission signals, a circular interposer waveguide approximately 1.85 mm in diameter may be fabricated, based on known or later developed waveguide design technology. In another example, to match the 120-140 GHz band of operation selected for the transceiver IC, an EIA standard WR-6 configuration waveguide region may be fabricated.

At 908, a characteristic impedance of the interposer waveguide at a second interface region of the interposer is matched to a characteristic impedance of the dielectric waveguide. This may be done be tapering the end of the waveguide region, as illustrated in FIG. 3, for example.

At 910, the first interface region is coupled to the second interface region with the interposer waveguide within the interposer. The waveguide may be open (air) or filled with a dielectric. An open waveguide region may be coated with a conductive coating to make a metal waveguide.

In this manner, an interposer that acts as a buffer zone is used to establish two well defined reference planes that can be optimized independently. A first plane is located between the radiating elements and the interposer and a second plane is a surface between the interposer and the DWG interconnect. The interposer allows for the introduction of features that improve the isolation between transmitter and receiver antennas in the device, relax the alignment tolerances, and enhance the impedance matching between the antennas and the dielectric waveguide.

At 912, a front-side signal is launched from the front side of the antenna structure into the interposer waveguide using the first interface region.

At 914, back-scatter radiation launched from the backside of the antenna structure is guided from the antenna structure to a reflecting surface using a substrate integrated waveguide as described in more detail herein above. The back-scatter radiation undergoes a $\lambda/2$ phase shift due to the reflection.

At 916, the reflected back-scatter signal is guided from the reflecting surface back to the first interface. The length of the substrate integrated waveguide is selected to be approximately $\lambda/4$ of the signal in the substrate material. When the reflected back-scatter signal reaches the first interface, it is phase shifted by $\lambda/4+\lambda/2+\lambda/4=\lambda$ and therefore it combines with the front-side signal in a positive manner to boost the signal that is delivered to the DWG.

OTHER EMBODIMENTS

In described examples, a transceiver implemented in a BGA package with a multilayer substrate was described. Other examples may use other known or later developed integrated circuit packaging techniques to provide a transceiver that includes one or more antennas located on a surface of the multilayer substrate.

In described examples, a transceiver having a multilayer substrate dimension of 6 mm×8 mm with two antennas operating in the 120-140 GHz band is described. In other examples, different size and shaped transceiver packages may be accommodated by adjusting the size of the interposer accordingly. Operation in different frequency bands may be accommodated by selecting different sized waveguide regions for the SIW and different thickness of the multilayer substrate so that the length of the SIW is approximately $\lambda/4$ of the signal within the substrate.

The thickness and overall shape of the SIV and interposer may be selected to provide mechanical and electrical characteristics needed for a selected DWG interconnect structure.

In described examples, copper is used as a conductive layer in the multilayer substrate. In other examples, other types of conductive metals or non-metallic conductors may be used to pattern signal lines and antenna structures, for example.

In described examples, copper is used to fill the vias and/or milled troughs to form the substrate integrated waveguide. In other examples, other types of conductive metals or non-metallic conductors may be used to fill the vias and/or troughs to form the SIW.

In described examples, circular and rectangular substrate integrated waveguides are described. In another example, an elliptical or other shape of SIW may be fabricated to support various types of signal propagation.

In described examples, the stacked vias that form the SIW include contact pads on each layer of the multilayer substrate. In another example, the contact pads may be eliminated or reduced to a minimal size to make the SIW less jagged to reduce parasitics and thereby enhance performance.

In described example, a transmitter antenna and SIW and a receiver antenna and SIW are described. In other examples, there may be only a single antenna and SIW, or there may be multiple transmitter and/or receiver antennas with respective SIWs.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. An integrated substrate comprising:
   a first body of insulating material having a first side and a second side, the sides being opposite one another;
   a first conductive layer on the first side;
   conductive waveguide tops arranged in a geometric pattern on the second side;
   a waveguide formed in the substrate between the first conductive layer and the waveguide tops, the waveguide including conductive waveguide vias connecting the first conductive layer to the waveguide tops, the waveguide vias being arranged in the geometric pattern through the body of insulating material to form a substantially solid waveguide wall having the geometric pattern;

antennas formed in a metal layer on the second side of the substrate, the antennas being within the geometric pattern of the waveguide tops;

a second body of insulating material having a third side formed on the first conductive layer opposite the first body and having a fourth side opposite the third side;

antenna pads formed on the fourth side of the second body; and antenna vias formed in the first body and in the second body connecting the antennas to the antenna pads.

2. The integrated substrate of claim 1 in which the waveguide vias have diameters and the substantially solid waveguide wall is formed by the distances between adjacent waveguide vias being less than the diameters.

3. The integrated substrate of claim 1 in which the substantially solid waveguide wall is formed by distances between adjacent waveguide vias being less than a wave length of a millimeter signal adapted to be carried by the waveguide.

4. The integrated substrate of claim 1 in which the waveguide vias have diameters and the substantially solid waveguide wall is formed by adjacent waveguide vias touching one another.

5. The integrated substrate of claim 1 in which the geometric pattern is circular.

6. The integrated substrate of claim 1 in which the waveguide vias are arranged to be tapered from the first conductive layer radially outward to the waveguide tops.

7. The integrated substrate of claim 1 including groups of waveguide vias connecting the first conductive layer to the waveguide tops, each group connecting the first conductive layer to one waveguide top and each group including waveguide pads connecting together the waveguide vias of that group.

8. The integrated substrate of claim 1 in which the waveguide tops are metal pads in a metal layer on the second side of the substrate.

9. The integrated substrate of claim 1 in which the waveguide tops are equally spaced on the second side of the substrate.

10. The integrated substrate of claim 1 in which the conductive first layer includes openings for the antenna vias.

11. The integrated substrate of claim 1 in which the antennas are generally rectangular members, with a rounded end, and are physically positioned and aligned 90 degrees apart from each other.

12. The integrated substrate of claim 1 in which a distance from the waveguide tops to the first layer is approximately $\lambda/4$ of a transmission signal though the waveguide.

13. The integrated substrate of claim 1 in which the waveguide tops are arranged in one row.

14. The integrated substrate of claim 1 in which the waveguide tops are arranged in two rows.

15. The integrated substrate of claim 1 in which the waveguide tops are arranged in two circular rings.

16. A system comprising:
(a) an integrated substrate including:
a first body of insulating material having a first side and a second side, the sides being opposite one another;
a first conductive layer on the first side;
conductive waveguide tops arranged in a geometric pattern on the second side; and
a waveguide formed in the substrate between the first conductive layer and the waveguide tops, the waveguide including conductive waveguide vias connecting the first conductive layer to the waveguide tops, the waveguide vias being arranged in the geometric pattern through the body of insulating material to form a substantially solid waveguide wall having the geometric pattern;
antennas formed in a metal layer on the second side of the substrate, the antennas being within the geometric pattern of the waveguide tops;
a second body of insulating material having a third side formed on the first conductive layer opposite the first body and having a fourth side opposite the third side;
antenna pads formed on the fourth side of the second body; and
antenna vias formed in the first body and in the second body connecting the antennas to the antenna pads;
(b) an integrated circuit coupled to the antenna pads; and
(c) an interposer having a conductive lower edge coupled to the waveguide tops.

17. The integrated substrate of claim 16 in which the waveguide vias have diameters and the substantially solid waveguide wall is formed by the distances between adjacent waveguide vias being less than the diameters.

18. The integrated substrate of claim 16 in which the substantially solid waveguide wall is formed by distances between adjacent waveguide vias being less than a wave length of a millimeter signal adapted to be carried by the waveguide.

19. The integrated substrate of claim 16 in which the waveguide vias have diameters and the substantially solid waveguide wall is formed by adjacent waveguide vias touching one another.

20. The integrated substrate of claim 16 in which the geometric pattern is circular.

21. The integrated substrate of claim 16 in which the waveguide vias are arranged to be tapered from the first conductive layer radially outward to the waveguide tops.

22. The integrated substrate of claim 16 including groups of waveguide vias connecting the first conductive layer to the waveguide tops, each group connecting the first conductive layer to one waveguide top and each group including waveguide pads connecting together the waveguide vias of that group.

23. The integrated substrate of claim 16 in which the waveguide tops are metal pads in a metal layer on the second side of the substrate.

24. The integrated substrate of claim 16 in which the waveguide tops are equally spaced on the second side of the substrate.

25. The integrated substrate of claim 16 in which the conductive first layer includes openings for the antenna vias.

26. The integrated substrate of claim 16 in which the antennas are generally rectangular members, with a rounded end, and are physically positioned and aligned 90 degrees apart from each other.

27. The integrated substrate of claim 16 in which a distance from the waveguide tops to the first layer is approximately $\lambda/4$ of a transmission signal though the waveguide.

28. The integrated substrate of claim 16 in which the waveguide tops are arranged in one row.

29. The integrated substrate of claim 16 in which the waveguide tops are arranged in two rows.

\* \* \* \* \*